(12) United States Patent
Shane et al.

(10) Patent No.: US 11,382,270 B2
(45) Date of Patent: Jul. 12, 2022

(54) ATTACHMENT AND SUPPORT SYSTEM FOR A HARVESTER SYSTEM

(71) Applicant: CNH Industrial America LLC, New Holland, PA (US)

(72) Inventors: Nicholas Stephen Shane, Bennett, IA (US); Chad Aerts, Grand Haven, MI (US); Ronald DeCamp, Wilmington, DE (US); Paula Minuto Meagher, Loveland, OH (US); Robert D. Crandall, Lancaster, PA (US); Shaun A. O'Donnell, Lititz, PA (US); Jeffrey Norton, Lebanon, PA (US); Steven E. Gaedy, New Holland, PA (US); Keith J. Weiss, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 387 days.

(21) Appl. No.: 16/534,311

(22) Filed: Aug. 7, 2019

(65) Prior Publication Data
US 2021/0037692 A1 Feb. 11, 2021

(51) Int. Cl.
*A01D 46/08* (2006.01)
*A01D 46/10* (2006.01)
*A01B 59/06* (2006.01)

(52) U.S. Cl.
CPC ............ *A01D 46/10* (2013.01); *A01B 59/066* (2013.01); *A01D 46/08* (2013.01); *A01D 46/082* (2013.01); *A01D 46/088* (2013.01)

(58) Field of Classification Search
CPC .. A01B 59/066; A01D 46/082; A01D 46/088; A01D 46/08; A01D 46/081; A01D 46/10; A01D 47/00
See application file for complete search history.

(56) References Cited

U.S. PATENT DOCUMENTS

| | | | | |
|---|---|---|---|---|
| 2,509,970 | A * | 5/1950 | Vernee .................... | A01D 46/08 56/30 |
| 2,795,917 | A * | 6/1957 | Meier ................... | A01D 46/088 56/44 |
| 3,464,191 | A * | 9/1969 | Dean ....................... | A01D 46/08 56/13.3 |
| 4,348,856 | A * | 9/1982 | Copley ................... | A01D 46/08 56/13.6 |
| 5,878,558 | A * | 3/1999 | Fox ......................... | A01D 46/08 56/14.7 |
| 6,408,605 | B1 * | 6/2002 | Orsborn ................. | A01D 46/08 56/28 |

(Continued)

FOREIGN PATENT DOCUMENTS

| CN | 201278659 | 7/2009 |
|---|---|---|
| WO | 2007046778 A1 | 4/2007 |

*Primary Examiner* — Adam J Behrens
(74) *Attorney, Agent, or Firm* — Peter Zacharias; Patrick Sheldrake

(57) ABSTRACT

A harvester system that includes a work vehicle. A harvester attachment removably couples to the work vehicle. The harvester attachment includes a tool bar. A quick connector couples to the tool bar. The quick connector removably couples and uncouples the harvester attachment to the work vehicle. A support system removably couples to the work vehicle. The support system supports operation of the harvester attachment.

13 Claims, 4 Drawing Sheets

(56) References Cited

U.S. PATENT DOCUMENTS

| | | | | |
|---|---|---|---|---|
| 8,028,506 B1* | 10/2011 | Casper | ................ | A01D 46/081 56/14.2 |
| 8,276,356 B2* | 10/2012 | Johannsen | ............. | A01D 46/08 56/17.2 |
| 9,491,908 B2* | 11/2016 | Hadley | ................. | A01D 46/08 |
| 2007/0015592 A1* | 1/2007 | Lukac | ................... | A01D 69/00 464/162 |
| 2008/0092506 A1* | 4/2008 | Philips | ................ | A01D 46/081 56/28 |
| 2011/0209452 A1* | 9/2011 | Goering | ............... | A01C 23/047 56/13.5 |
| 2011/0209454 A1* | 9/2011 | Johannsen | ............. | A01D 46/08 56/30 |
| 2013/0008141 A1* | 1/2013 | Hadley | ................. | A01D 46/08 56/14.7 |
| 2015/0135672 A1* | 5/2015 | Minnich | ................ | A01D 61/00 56/14.6 |
| 2019/0281755 A1* | 9/2019 | Heckeroth | ........... | A01B 59/066 |

* cited by examiner

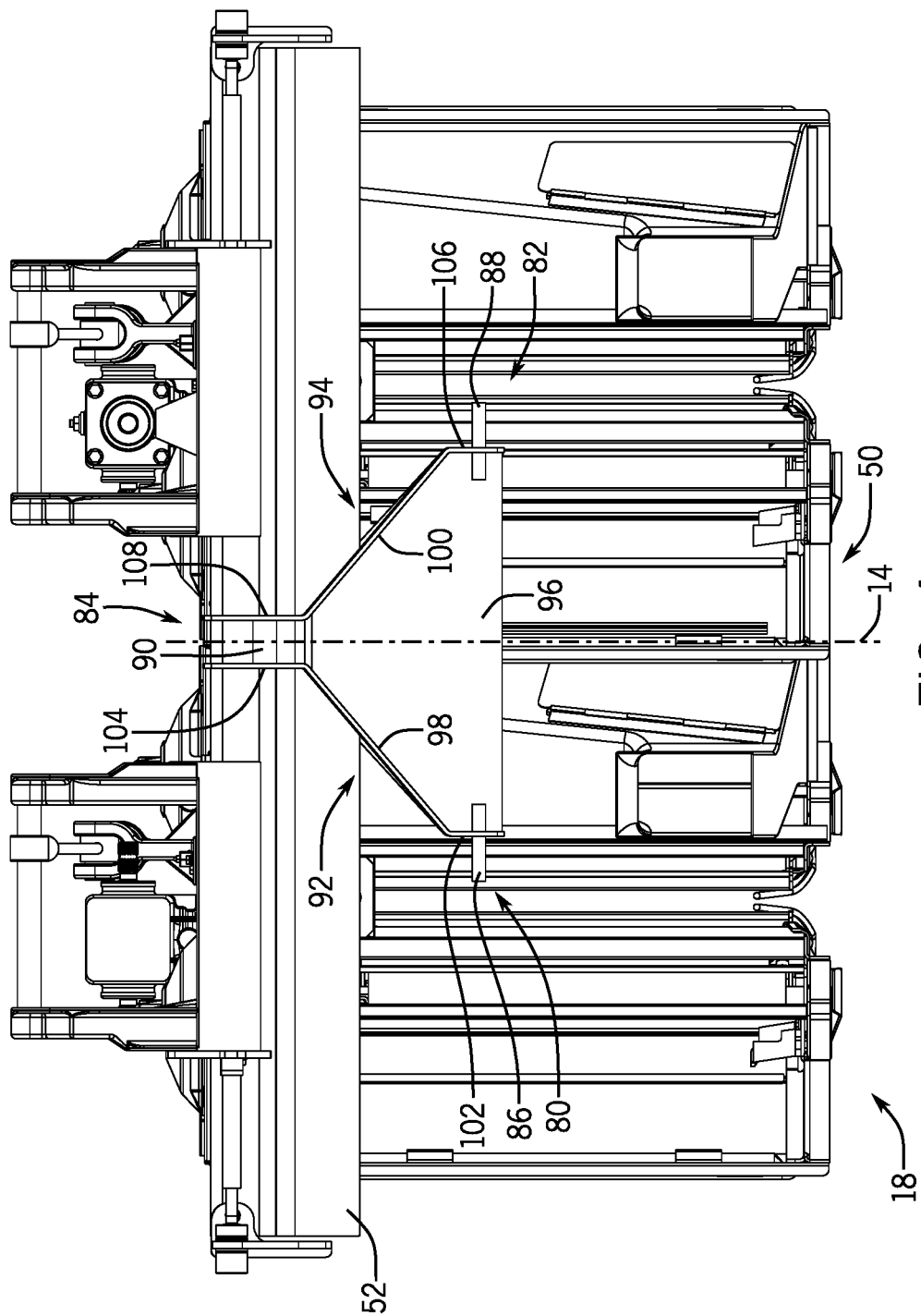

ATTACHMENT AND SUPPORT SYSTEM FOR A HARVESTER SYSTEM

BACKGROUND

The present disclosure relates generally to a harvester system.

The agricultural industry uses a variety of tools and machines to harvest different kinds of crops. For example, a combine harvester is a machine that uses a thresher to harvest wheat, barley, etc. Other harvesters include drums that enable harvesting of crops such as cotton. These machines are typically self-propelled and perform a single task. In other words, a farmer may purchase a combine harvester to harvest grains, a cotton harvester to harvest cotton, a corn harvester to harvest corn, a potato harvester to harvest potatoes, etc. Each additional machine may therefore increase a farm's operating costs while remaining idle for most of the year (i.e., times other than during the harvest).

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a harvester system that includes a work vehicle. A harvester attachment removably couples to the work vehicle. The harvester attachment includes a tool bar. A quick connector couples to the tool bar. The quick connector removably couples and uncouples the harvester attachment to the work vehicle. A support system removably couples to the work vehicle. The support system supports operation of the harvester attachment.

In another embodiment, a harvester system that includes a harvester attachment. The harvester attachment removably couples to a work vehicle. The harvester attachment includes a quick connector that couples and uncouples the harvester attachment to the work vehicle. A support system removably couples to the work vehicle. The support system supports operation of the harvester attachment.

In another embodiment, a cotton picker system that includes a cotton picker attachment. The cotton picker attachment removably couples to a work vehicle. The cotton picker attachment includes a tool bar. A three-point quick connector removably couples and uncouples the cotton picker attachment to the work vehicle. A support system removably couples to the work vehicle. The support system supports operation of the cotton picker attachment.

DRAWINGS

These and other features, aspects, and advantages of the present disclosure will become better understood when the following detailed description is read with reference to the accompanying drawings in which like characters represent like parts throughout the drawings, wherein:

FIG. 4 is a rear view of a harvester attachment with a quick connector, in accordance with an embodiment of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

A harvester collects agricultural product and separates portions of the agricultural product into harvested goods (e.g., cotton) and other agricultural materials (e.g., chaff, foliage, dirt) as the harvester travels across an agricultural field. The harvested goods and the other agricultural materials are discharged into outlets, such as a harvested goods outlet and a discharge outlet, respectively. Typical self-propelled harvesters may be large and/or expensive and may only be used during the harvest. Thus, the disclosed embodiments provide a system that facilitates conversion or modification of another agricultural or work vehicle into a harvester. For example, a tractor may be used throughout the year to carry out various farming jobs (e.g., non-harvesting jobs). As harvesting season approaches, an operator (e.g., farmer) may modify the tractor, such as by coupling harvester components (e.g., one or more drum assemblies, a blower, a bin, a cabin) to certain tractor components (e.g., a tractor chassis supporting wheels, an engine, a transmission, a heating and air ventilation (HVAC) system), to form a harvester system (e.g., a tractor-mounted harvester or a modified tractor). After the harvest, the operator may again separate the harvester components from the tractor, enabling the tractor to be reconstructed and used for other farming jobs.

Figure 1:
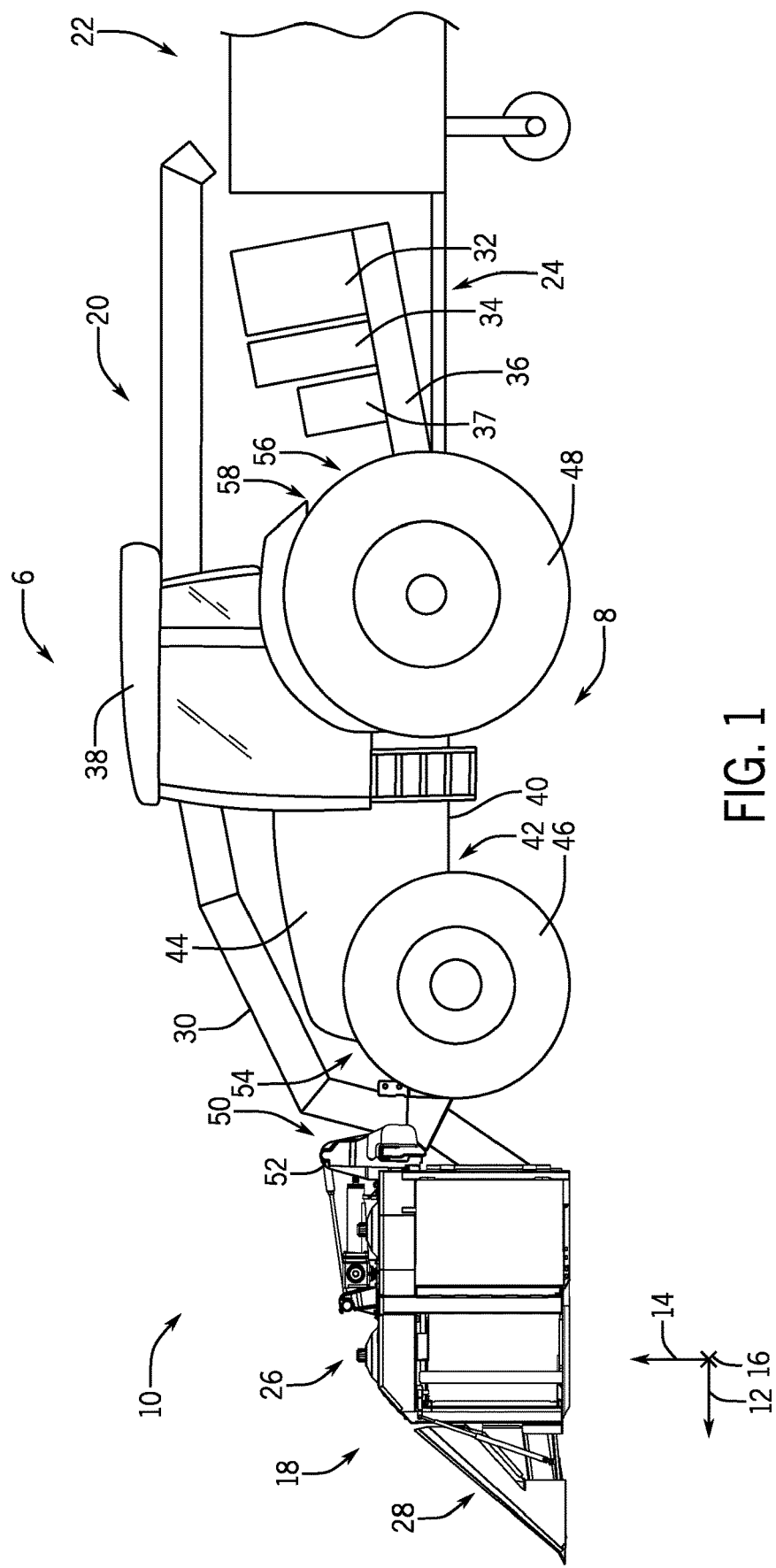
FIG. 1 is a side view of a harvester system with a tractor coupled to a harvester attachment configured to harvest rows of a crop, in accordance with an embodiment of the present disclosure.

Turning now to the drawings, FIG. 1 is a perspective view of an embodiment of a harvester system 6. The harvester system 6 combines two main pieces of equipment, a tractor 8 (e.g., tractor assembly, work vehicle) and a harvester kit 10. To facilitate the discussion, the harvester system 6 and its components may be described with reference to a longitudinal axis or direction 12, a vertical axis or direction 14, and a lateral axis or direction 16. By attaching the harvester kit 10 to the tractor 8, the tractor 8 is able to be used both as a harvester and for other jobs or agricultural tasks. The harvester kit 10 may include a harvester attachment 18, a transport system 20, a bin 22, and a support system 24.

As shown, the harvester attachment 18 includes multiple drum assemblies 26 (e.g., harvesting heads) and plant lifters 28. In operation, the plant lifters 28 lift the stems, branches, etc. of the plant for harvesting by the drum assemblies 26. The drum assemblies 26 harvest the cotton using one or more rotors to separate the cotton from other agricultural materials (e.g., chaff, foliage, stems, debris). It should be appreciated that although two drum assemblies 26 are shown (shown in FIGS. 2-4), the harvester attachment 18 may have any suitable number of drum assemblies 26, such as 1, 2, 3, 4, 5, 6, or more drum assemblies 26. In some embodiments, the harvester attachment 18 may include a drive system (e.g., pulley system) that drives the multiple drum assemblies 26, a blower, and/or other components.

In order to transfer the harvested goods from the harvester attachment 18, the harvester kit 10 includes the transport system 20 that includes a blower (e.g., fan) that is configured to blow air that directs the harvested goods through one or more conduits 30 to a bin 22 (e.g., basket or baler). In some embodiments, the transport system 20 may be configured to move (e.g., pivot or rotate) to transfer the harvested goods from the agricultural attachment 18 to another container or onto a field. In some embodiments, the residual agricultural materials may be deposited onto the agricultural field beneath and/or behind the harvester attachment 18.

The support system 24 supports operation of the harvester attachment 18. For example, the support system 24 may include a hydraulic pump 32 that fluidly couples to the harvester attachment 18 (e.g., hydraulic lines or conduits). In operation, the hydraulic pump 32 provides hydraulic pressure to lift the harvester attachment 18, drive the drum assemblies 26, among other components. In some embodiments, the hydraulic pump 32 may be a power take-off hydraulic pump 32, which receives its power directly from the tractor 8. The support system 24 may also include a fluid tank 34. The fluid tank 34 may provide lubricating and/or cleaning fluid (e.g., water) to the harvester attachment 18 to facilitate harvesting operations. The hydraulic pump 32 and fluid tank 34 may be supported on a platform 36. The platform 36 couples to and uncouples from the tractor 8 enabling the tractor 8 to be transformed into a harvester system. In some embodiments, the support system 24 may include a motor 37 for powering the hydraulic pump 32 and/or other pumps (e.g., a pump that pumps fluid from the fluid tank 34). The motor 37 may also be used to power blowers or fans that transport agricultural product (e.g., cotton) from the harvester attachment 18 to the bin 22.

As illustrated, the tractor 8 may include a cabin 38 to support or house an operator. It should be understood that the cabin 38 may be an enclosed cabin (e.g., a climate-controlled cabin), as shown, or the cabin 38 may be a platform (e.g., open or non-enclosed platform) on which the operator may sit or stand, for example. In the illustrated embodiment, the cabin 38 includes one or more operator interfaces and/or input devices 40 (e.g., switch, knob, light, display, steering wheel, gear shift lever, touch screen) that enables the operator to monitor and/or control various functions of the harvester attachment 18 and the tractor 8. As shown, the cabin 38 is supported on a chassis 42. In addition to supporting the cabin 38, the chassis 42 supports an engine 44, a fuel system, hydraulic systems, transmission, radiator, HVAC system, among others. The chassis 42 is supported by front wheels 46 and rear wheels 48. In some embodiments, the tractor 8 may include tracks in place of the front wheels 46 and/or rear wheels 48.

As explained above, the harvester kit 10 or conversion kit couples to the tractor 8 to create or build the harvester system 6. Thus, at certain times of the year, the operator may utilize the tractor 8 to carry out various agricultural operations. However, during a harvesting season, the operator may separate the tractor assembly 8 from other equipment, and then couple the harvester kit 10 to the tractor 8 to form the harvester system 6. At the conclusion of the harvesting season, the operator may again separate the tractor 8 from the harvester kit 10 to perform other tasks.

To facilitate coupling and uncoupling of the harvester kit 10 to and from the tractor 8, the harvester kit 10 may include one or more quick connectors. The quick connectors enable rapid assembly and disassemble of the harvester system 6. For example, the harvester attachment 18 may include a quick connector 50. The quick connector 50 may be a three-point connector that enables the rapid coupling and uncoupling of the tool bar 52 to the tractor 8. For example, the quick connector 50 may enable coupling to a three-point hitch 54 on the tractor 8. Similarly, the support system 24 may couple to the tractor 8 with a quick connector 56. The quick connector 56 may similarly be a three-point connector, which couples the platform 36 to a three-point hitch on the tractor 8. The bin 22 similarly couples to the tractor 8. In some embodiments, the bin 22 may couple to the tractor 8 with a quick connector (e.g., three-point connector) or may couple to a standard hitch on the tractor 8.

Figure 2:
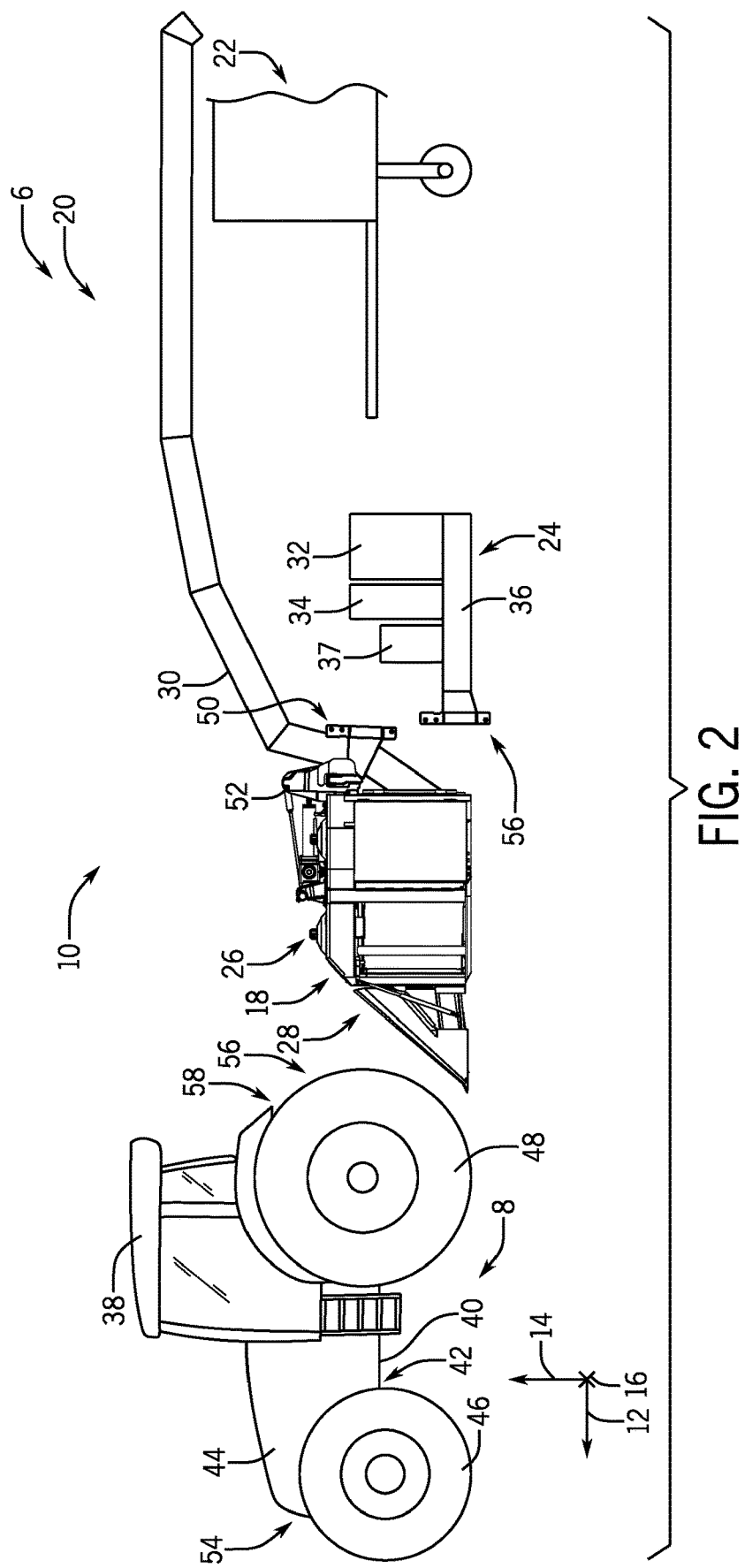
FIG. 2 is a side view of a harvester system with a harvester attachment uncoupled from a tractor, in accordance with an embodiment of the present disclosure.

FIG. 2 is a side view of the harvester system 6 with the harvester attachment 18, support system 24, and bin 22 uncoupled from the tractor 8. As explained above, the harvester kit 10 enables the tractor 8 to be used in different configurations for different jobs. For example, during harvesting season, the operator may separate the tractor 8 from other tractor components in order to couple the harvester kit 10 to the tractor 8 to carry out harvesting operations. At the conclusion of the harvesting season, the operator may again separate the tractor assembly 8 from the harvester kit 10 in order to use the tractor 8 for other farm jobs. Quick connectors such as quick connectors 50 and 56 (e.g., three-point connectors) may therefore enable the rapid assembly and disassembly of the harvester system 6.

Figure 3:
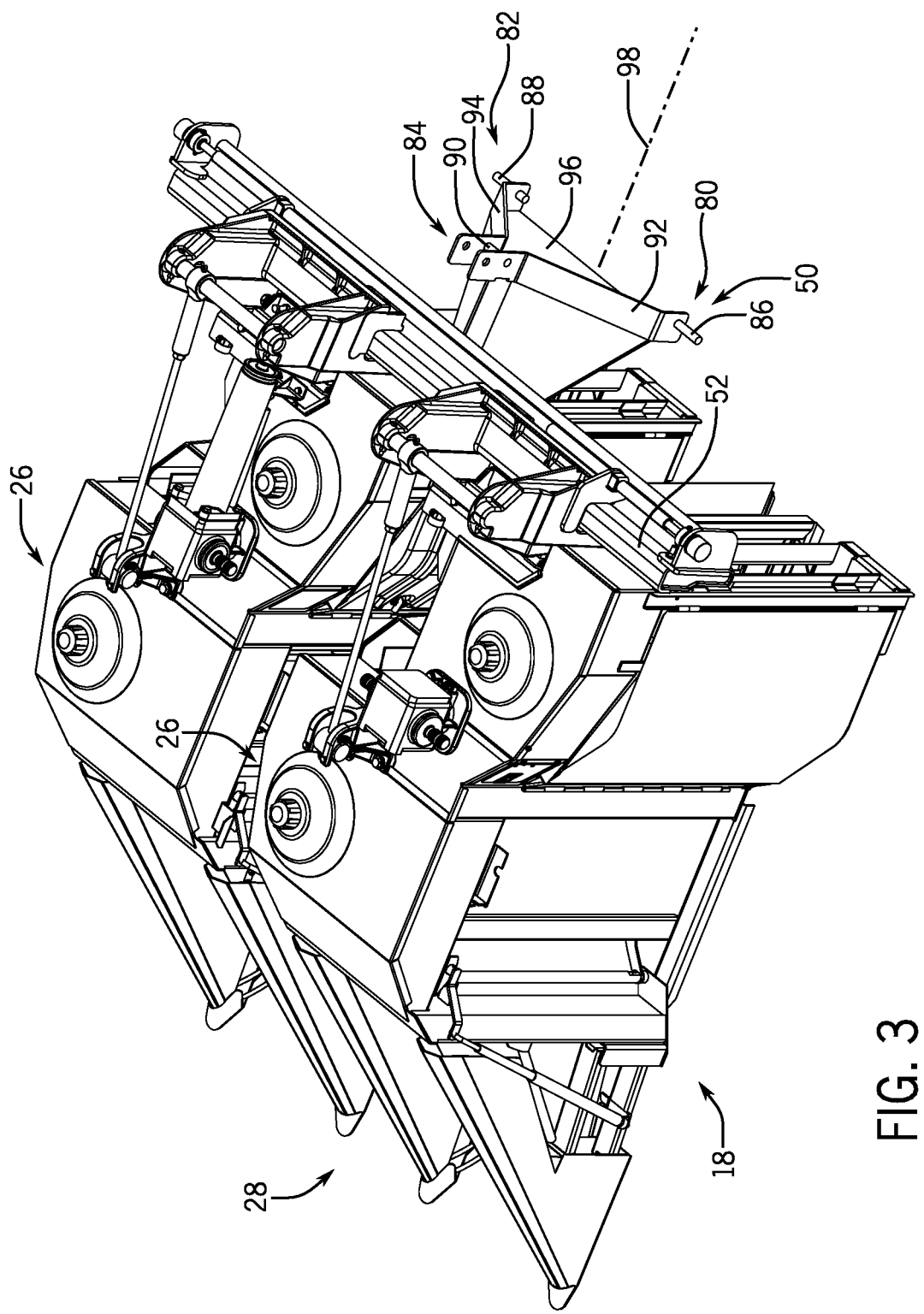
FIG. 3 is a perspective view of a harvester attachment with a quick connector, in accordance with an embodiment of the present disclosure.

FIG. 3 is a perspective view of the harvester attachment 18 with the quick connector 50. The quick connector 50 may couple to the tool bar 52. The tool bar 52 in turn couples to and supports the other components of the harvester attachment 18. The quick connector 50 is a three-point connector that includes three connection points 80, 82, and 84 that engage the three-point hitch 54 on the tractor 8. The quick connector 50 forms a triangular layout with a base formed by the connection points 80 and 82, and the tip of the triangle formed with connection point 84. The connection points 80, 82, and 84 include respective bars or shafts 86, 88, and 90. The bars 86, 88, and 90 couple to first and second plates 92, 94. The first and second plates 92, 94 couple to the tool bar 52 enabling the tractor 8 to couple to the harvester attachment 18. In some embodiments, the quick connector 50 may include a third plate 96 that extends between the first plate 92 and the second plate 94. The third plate 96 may provide rigidity for the quick connector 50. For example, the third plate 96 may resist torsional forces acting on the quick connector 50. In some embodiments, the first and second plates 92 and 94 are angled inward between the distal and the proximal ends of the quick connector 50 with respect to a longitudinal axis 14 of the harvester attachment 18.

FIG. 4 is a rear view of the harvester attachment 18 with the quick connector 50. As illustrated, the first and second plates 92 and 94 define an irregular shape. In some embodiments, the first and second plates 92, 94 may have the same shape. For example, both the first and second plates 92, 94 may define respective first and second angled surfaces 98, 100 that enable the quick connector to form a triangular shape. The first and second angled surfaces 98, 100 are angled relative to the longitudinal axis 14. As illustrated, the first and second angled surfaces 98, 100 in turn couple to additional surfaces that receive the shafts or bars 86, 88, and 90. The first angled surface 98 couples to a first surface 102 and a second surface 104. The second angled surface 100 similarly couples to a third surface 106 and a fourth surface 108. As illustrated, the first, second, third, and fourth surfaces 102, 104, 106, and 108 are parallel to or substantially parallel to the longitudinal axis 14. In this orientation, the first, second, third, and fourth surfaces 102, 104, 106, and 108 support the shafts or bars 86, 88, and 90 in an orientation that enables coupling with the three-point hitch 54 on the tractor 8. For example, the shafts or bars 86, 88, and 90 may be perpendicular or substantially perpendicular to the longitudinal axis 14. As illustrated, the bar 86 couples to the first plate 92 and may extend through the first surface 102, while the bar 88 couples to the second plate 94 and extends through the third surface 106. The third bar 90 couples to and extends between both the first and second plates 92 and 94. In operation, the shafts 86, 88, and 90 are configured to couple to the three-point hitch on the tractor 8 enabling movement of the harvester attachment 18.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A harvester system, comprising:
   a work vehicle;
   a harvester attachment configured to removably couple to the work vehicle, the harvester attachment comprising:
      a tool bar; and
      a three-point quick connector coupled to the tool bar, wherein the three-point quick connector is configured to removably couple and uncouple the harvester attachment to a forward three point hitch of the work vehicle; and
   a support system configured to removably couple to a rearward three point hitch of the work vehicle via a second three-point quick connector, wherein the support system comprises:
      a fluid tank configured to fluidly couple to the harvester attachment to provide fluid to lubricate the harvester attachment;
      a motor for a fan configured to drive agricultural product from the harvester attachment to a bin;
      and, a hydraulic pump configured to fluidly couple to the harvester attachment, wherein the hydraulic pump is configured to provide hydraulic pressure to operate the harvester attachment.

2. The system of claim 1, wherein the harvester attachment comprises a cotton picker.

3. The system of claim 2, wherein the bin is configured to removably couple to the work vehicle.

4. The system of claim 3, wherein the cotton picker comprises a duct configured to direct cotton to the bin.

5. The system of claim 1, wherein the hydraulic pump is a power take-off powered hydraulic pump configured to receive power from the work vehicle.

6. A harvester system, comprising:
   a harvester attachment, wherein the harvester attachment is configured to removably couple to a work vehicle, the harvester attachment comprising:
      a three-point quick connector configured to couple and uncouple the harvester attachment to a forward three point hitch of the work vehicle; and
   a support system configured to removably couple to a rearward three point hitch of the work vehicle via a second three-point quick connector, wherein the support system comprises:
      a fluid tank configured to fluidly couple to the harvester attachment to provide fluid to lubricate the harvester attachment;
      a motor for a fan configured to drive agricultural product from the harvester attachment to a bin;
      and, a hydraulic pump configured to fluidly couple to the harvester attachment, wherein the hydraulic pump is configured to provide hydraulic pressure to operate the harvester attachment.

7. The system of claim 6, wherein the harvester attachment comprises a tool bar, and wherein the three-point quick connector is configured to couple to the tool bar.

8. The system of claim 6, wherein the harvester attachment comprises a cotton picker.

9. The system of claim 8, wherein the bin is configured to removably couple to the work vehicle.

10. The system of claim 9, wherein the cotton picker comprises a duct configured to direct cotton to the bin.

11. A cotton picker system, comprising:
    a cotton picker attachment, wherein the cotton picker attachment is configured to removably couple to a work vehicle, the cotton picker attachment comprising:
       a tool bar; and
       a three-point quick connector configured to removably couple and uncouple the cotton picker attachment to a forward three point hitch of the work vehicle; and
    a support system configured to removably couple to a rearward three point hitch of the work vehicle via a second three-point quick connector, wherein the support system comprises:
       a fluid tank configured to fluidly couple to the harvester attachment to provide fluid to lubricate the harvester attachment;
       a motor for a fan configured to drive agricultural product from the harvester attachment to a bin;
       and, a hydraulic pump configured to fluidly couple to the harvester attachment, wherein the hydraulic pump is configured to provide hydraulic pressure to operate the harvester attachment.

12. The system of claim 11, wherein the bin is configured to removably couple to the work vehicle.

13. The system of claim 12, wherein the cotton picker system comprises a duct configured to direct cotton to the bin.

* * * * *